Nov. 30, 1965 D. A. PAY 3,221,258

SIGNAL CLIPPING CIRCUIT ARRANGEMENTS

Filed Dec. 21, 1961 2 Sheets-Sheet 1

INVENTOR
Donald Alexander Pay
BY
Baldwin & Wight
ATTORNEYS

Nov. 30, 1965 D. A. PAY 3,221,258
SIGNAL CLIPPING CIRCUIT ARRANGEMENTS
Filed Dec. 21, 1961 2 Sheets-Sheet 2

INVENTOR
Donald Alexander Pay
BY Baldwin & Wight
ATTORNEYS

United States Patent Office 3,221,258

Patented Nov. 30, 1965

3,221,258

SIGNAL CLIPPING CIRCUIT ARRANGEMENTS

Donald Alexander Pay, West Hanningfield, Essex, England, assignor to The Marconi Company Limited, a company of Great Britain Filed Dec. 21, 1961, Ser. No. 161,193
Claims priority, application Great Britain, Jan. 13, 1961, 1,521/61
9 Claims. (Cl. 328—171)

This invention relates to signal clipping circuit arrangements and more particularly, although not exclusively, to such arrangements adapted for use with television signals.

It is a defect of known clipping circuit arrangements that distortion of the clipped output waveform occurs at the change-over from the reference clipping potential to that of the unclipped portion of the waveform and vice versa, and it is the object of the present invention to provide improved clipping circuit arrangements in which the above-mentioned distortion is eliminated or at least substantially reduced.

According to this invention a signal clipping circuit arrangement comprises a first unilaterally conductive device from one terminal of which clipped output signals are taken and across which is connected a loop circuit including a phase inverter and an impedance in series; and a second unilaterally conductive device adapted to control the application of signals to be clipped to the input side of said first device in dependence upon the instantaneous amplitude of said signals.

Preferably the two unilaterally conductive devices are connected back to back between a point where the signals to be clipped are applied and said one terminal of the first device from which clipped output signals are taken, the junction point of the two devices being connected to the input terminal of a phase inverting stage, the output of which is applied through an impedance to said one terminal. Preferably two further oppositely poled unilateral devices are also connected between the point where the signals to be clipped are applied and said one terminal of the first device from which clipped output signals are taken and the junction point of said further devices is earthed through a further resistance, said further devices being so poled that the direction of conductivity of each is opposite to that of that one of the first-mentioned back-to-back devices which has one terminal common therewith.

Preferably the output of the phase inverter is clamped to a predetermined and, if desired, adjustable potential.

Preferably input signals to be clipped are applied through a cathode follower and said impedance is constituted by a second cathode follower.

Preferably the input signals to be clipped are clamped to a predetermined and, if desired, adjustable potential.

Figure 1:
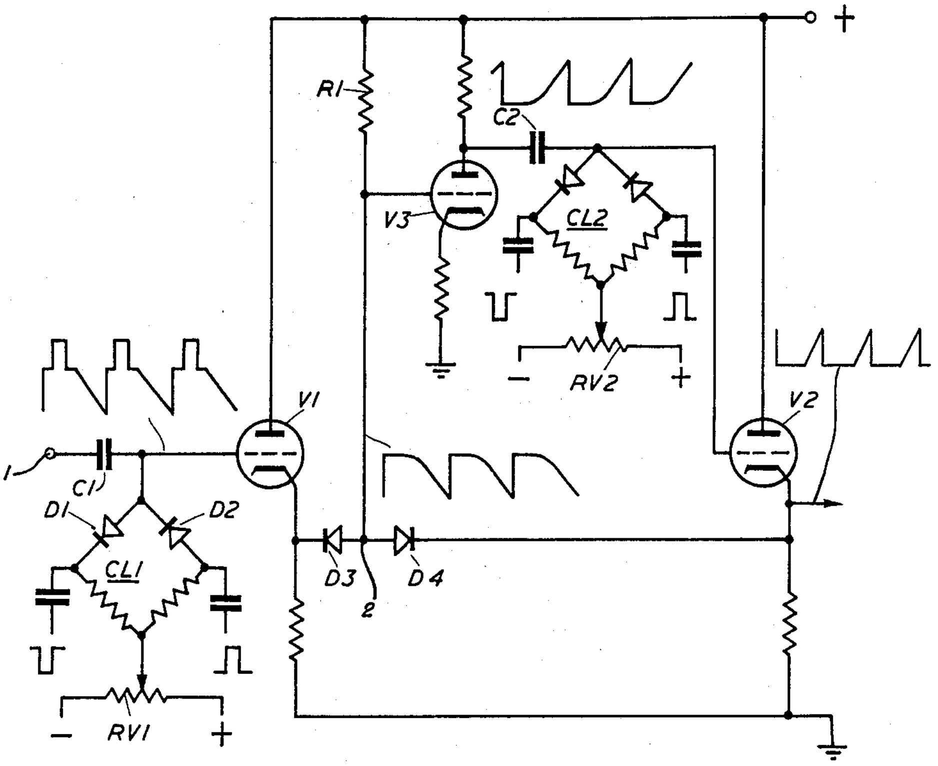
Figure 2:
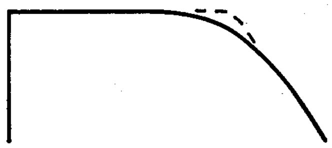
Figure 3:
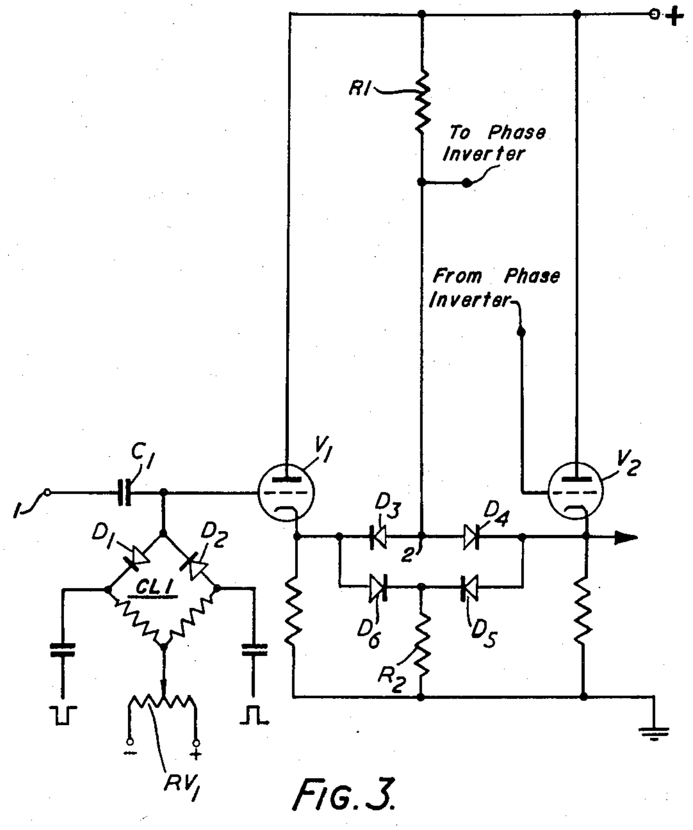

The invention is further described with reference to the accompanying drawings. For convenience of reference the figures in the drawings are numbered consecutively. FIGURE 1 shows one embodiment of the invention; FIGURE 2 is a graphical figure relating to the embodiment of FIGURE 1; and FIGURE 3 shows, so far as is necessary to an understanding thereof, a preferred modification of the circuit shown in FIGURE 1. In FIGURE 1 typical idealized waveforms are shown alongside those parts of the circuit at which, in practice, they occur.

Referring to FIGURE 1, input signals, which may comprise television signals having periodically recurring synchronising pulses, as shown, are applied to terminal 1 and thence to the control grid of the cathode follower valve $V_1$. The signals at the grid of valve $V_1$ are periodically clamped in known manner by means of the condenser $C_1$ and the known clamp $CL_1$, both rendered periodically conductive by means of pulses fed thereto from a source (not shown) so as to connect the grid of the valve to a D.C. potential whose value is determined by the setting of potentiometer $RV_1$.

Two diodes $D_3$ and $D_4$ have their anodes connected together at 2 and through a resistance $R_1$ to the positive terminal of a source (not shown) of H.T. potential while the cathode of diode $D_3$ is connected to the cathode of valve $V_1$ and the cathode of diode $D_4$ is connected to the cathode of a further cathode follower valve $V_2$. The cathode of valve $V_2$ constitutes a source of reference potential for the diode $D_4$ and, as so far described, the arrangement is known per se. Assuming that the control grid of valve $V_2$ is connected to a point of fixed potential, the described arrangement operates as follows. When the level of the signal appearing at the cathode of valve $V_1$ is below the potential of the cathode of valve $V_2$, diode $D_4$ is cut-off and diode $D_3$ is conductive so that the input signals appear at the junction point 2 of the diodes $D_3$ and $D_4$. When the potential at the cathode of $V_1$ rises above that at the cathode of $V_2$, however, diode $D_3$ cuts off and diode $D_4$ is rendered conductive whereby the potential at point 2 remains substantially the same as that of the cathode of $V_2$. On a subsequent decrease of the potential at the cathode of $V_1$, diode $D_4$ again becomes non-conducting and $D_3$ is rendered conductive. Thus, clipped signals appear at the point 2.

Diode $D_3$ thus operates to isolate diode $D_4$ from signal currents during the periods in which the signal potential exceeds the clipping potentials. This same result could be achieved in other ways, e.g. by replacing the resistance $R_1$ and diode $D_3$ by an arrangement, connected in parallel with the cathode resistance of valve $V_1$, and comprising a biased diode which is arranged to be conductive when the signal potential applied thereto exceeds the clipping potential, thereby providing a path for the signal currents.

The described arrangement suffers from the defect that, due to the fact that the switching of diodes $D_3$ and $D_4$ from the conductive to the non-conductive state and vice versa is not instantaneous, the shape of the signal waveform at the point where the change-over from the reference clipping potential to that of the unclipped portion of the signal waveform takes place is distorted. This is illustrated in FIGURE 2 which shows the clipped signal waveform obtained at point 2 of the arrangement of FIGURE 1 in the case in which the reference potential at the grid of valve $V_2$ and the clamping potential at the grid of valve $V_1$ are so chosen that the synchronising pulses are clipped off. The full line curve shows the actual waveform obtained while the dotted lines indicate the ideal waveform.

In accordance with the present invention the clipped signals from point 2 are applied to the control grid of a phase inverting valve $V_3$ and the phase inverted signals are applied to the control grid of cathode follower valve $V_2$ where thye are periodically clamped by means of condenser $C_2$ and clamp $CL_2$, which is similar to clamp $CL_1$, to a reference potential determined by the setting of potentiometer $RV_2$. Hence the diodes $D_3$ and $D_4$ will operate when the input signal reaches a potential equal to that appearing at the cathode of valve $V_2$ during the moments when the signal at the grid of valve $V_2$ is at the potential of the tapping point of potentiometer $RV_2$, and the point in the input signal waveform at which clipping occurs may be set by adjusting the clamping potential of either $CL_1$ or $CL_2$ or both.

Diode $D_4$ will be conductive only for the period over which the potential of point 2 is constant at the clipping value and subsequently decreases over the distorted part of the clipped waveform, which is as illustrated in FIGURE 2. Hence during this period there exists at the point 2, as stated above, a wave which is initially of constant potential and subsequently of non-linearly decreasing potential, while at the same time there is applied to the control grid of valve $V_2$ a wave which is the inverse of this and is initially of constant potential and subsequently of non-linearly increasing potential. As the control grid of $V_2$ may be regarded as connected to one end of an impedance, of value $1g_m$ where $g_m$ is the mutual conductance of the valve $V_2$, whose other end is connected to the cathode, it will be seen that, provided the gain of valve $V_3$ and the value of $g_m$ are correctly chosen, the cathode of valve $V_2$ will be of constant potential throughout the aforesaid period. Consequently the signal appearing at the cathode of valve $V_2$, and which constitutes the output of the clipping circuit in accordance with this invention, is a clipped but otherwise substantially undistorted reproduction of the input signal.

Apart from avoiding undesired distortion in the clipped output waveform the above-described embodiment of the invention provides the advantage that it will effectively clip signals of much higher frequencies than comparable known clipper circuits. In a practical case signals over the range 0–12 mc./s. have been clipped.

It will be seen that the provision of the clamps $CL_1$ and $CL_2$ is not essential, although it is preferred, in the present invention, as the D.C. levels of the input and phase inverted signals may be otherwise determined, e.g. the anode of valve $V_3$ may be directly coupled to the grid of valve $V_2$. Likewise the provision of cathode follower $V_1$ is not essential—but its provision is preferred as cathode follower $V_1$ provides a low impedance signal source, serves to isolate the clipping circuit proper from the preceding circuit and, together with valve $V_2$, provides for symmetry of the circuit and ensures that any changes in signal level due to changes in the supply potentials of valve $V_1$ are minimized.

The preferred modification shown in FIG. 3 differs from FIG. 1 in the provision of the additional diodes $D_5$ and $D_6$ and the additional resistance $R_2$. The anodes of valves $V_1$ and $V_2$ are directly connected to the source of H.T. potential as before, and point 2 again is connected thereto through the resistance $R_1$. Point 2 is also connected to the input of the phase inverter (not separately shown in FIGURE 3), the output of which is fed to the grid of valve $V_2$. The two additional diodes $D_5$ and $D_6$ are connected, cathode to cathode, between the cathodes of valves $V_1$ and $V_2$ and the common cathode point of the said two diodes is connected to earth through the resistance $R_2$. The resistance $R_2$ is chosen, in accordance with the cathode voltages of the valves $V_1$ and $V_2$, to be of such value as to pass the same standing current as the resistance $R_1$ so that the added diodes $D_5$ and $D_6$ operate under the same conditions as the diodes $D_3$ and $D_4$. Diodes $D_3$ and $D_5$ conduct simultaneously and diodes $D_4$ and $D_6$ are cut off during the portion of the signal it is desired to pass. When synchronising pulses are being clipped diodes $D_4$ and $D_6$ conduct and diodes $D_3$ and $D_5$ are cut off. The circuit of FIG. 3 offers the advantage over that of FIG. 1 that whereas, with FIG. 1, as clipping action starts the diode $D_3$ cuts off, suddenly changing the load on valve $V_1$ and slightly changing the operating point, with FIG. 3 the diode $D_6$ conducts when diode $D_3$ cuts off, so that substantially the same load impedance is presented to the valve $V_1$ under all conditions. Similarly the provision of diode $D_5$ ensures substantial constancy of load on the valve $V_2$. The overall result is a worth-while improvement in the high frequency performance of the clipper.

I claim:

1. A signal clipping circuit arrangement providing an output which is a clipped reproduction of an input signal, said circuit arrangement comprising a first unilaterally conductive device having input and output terminals; a loop circuit connected across said terminals and including a phase inverter; and a second unilaterally conductive device for clipping input signals applied thereto and being connected to apply the clipped signals to said input terminal, said output being taken from the output terminal of said first device and comprising a combination of signals taken from a first circuit path and a second circuit path leading to said output terminal, said first circuit path including the first unilaterally conductive device and said second circuit path including the phase inverter, and circuit parameters being so arranged that predetermined portions of the clipped signals passed by said first unilaterally conductive device to said output terminal cancel corresponding portions of inverted replicas of the clipped signals passed by said loop circuit to said output terminal.

2. A circuit arrangement as claimed in claim 1 wherein said output comprises pulses each having a substantially level portion followed by a continuously changing portion and the first unilaterally conductive device is so biased as to conduct during only said substantially level portion.

3. A circuit arrangement as claimed in claim 1 wherein clamping means are provided to hold the output from the phase inverter relative to a predetermined level.

4. A circuit arrangement as claimed in claim 3 wherein said predetermined level is adjustable.

5. A circuit arrangement as claimed in claim 1 wherein the input signals to be clipped are clamped relative to a predetermined potential.

6. A circuit arrangement as claimed in claim 5 wherein said predetermined potential is adjustable.

7. A circuit arrangement as claimed in claim 1 wherein said second unilaterally conductive device is connected to said first unilaterally conductive device with like terminals connected directly together and input signals to be clipped are applied to an input terminal of said second device which is remote from said first device.

8. A circuit arrangement as claimed in claim 7 wherein there are provided third and fourth unilaterally conductive devices connected in series between said input terminal of said second device and said output terminal of said first device, said third and fourth unilaterally conductive devices being connected with like terminals connected directly together but oppositely poled from said first and said second devices; and means for applying a reference potential to the directly connected terminals of said third and fourth devices.

9. A signal clipping circuit arrangement providing an output which is a clipped reproduction of an input signal, said circuit arrangement comprising a first unilaterally conductive device having input and output terminals; a loop circuit connected across said terminals and including a phase inverter and a first cathode follower connected to and fed by said phase inverter; a second cathode follower; and a second unilaterally conductive device for clipping input signals applied thereto through said second cathode follower and being connected to apply the clipped signals to said input terminal, said output being taken from the output terminal of said first device and comprising a combination of signals taken from a first circuit path and a second circuit path leading to said output terminal, said first circuit path including the first unilaterally conductive device and said second circuit path including the phase inverter and the first cathode follower, and circuit parameters being so arranged that predetermined portions of the clipped signals passed by said first unilaterally conductive device to said output terminal cancel corresponding portions of inverted replicas of the clipped signals passed by said loop circuit to said output terminal.

References Cited by the Examiner

UNITED STATES PATENTS

| | | | |
|---|---|---|---|
| 2,859,344 | 11/1958 | Imm | 328—54 |
| 2,890,335 | 6/1959 | Gibbon | 328—115 |
| 3,009,110 | 11/1961 | Cole et al. | 328—31 |
| 3,052,850 | 9/1962 | Fluhr | 307—88.5 |

ARTHUR GAUSS, *Primary Examiner.*

JOHN W. HUCKERT, *Examiner.*